Dec. 31, 1963 E. J. KIMM 3,115,891
COMBINED SHUT-OFF AND FLOW REGULATING VALVE
Filed Nov. 23, 1960
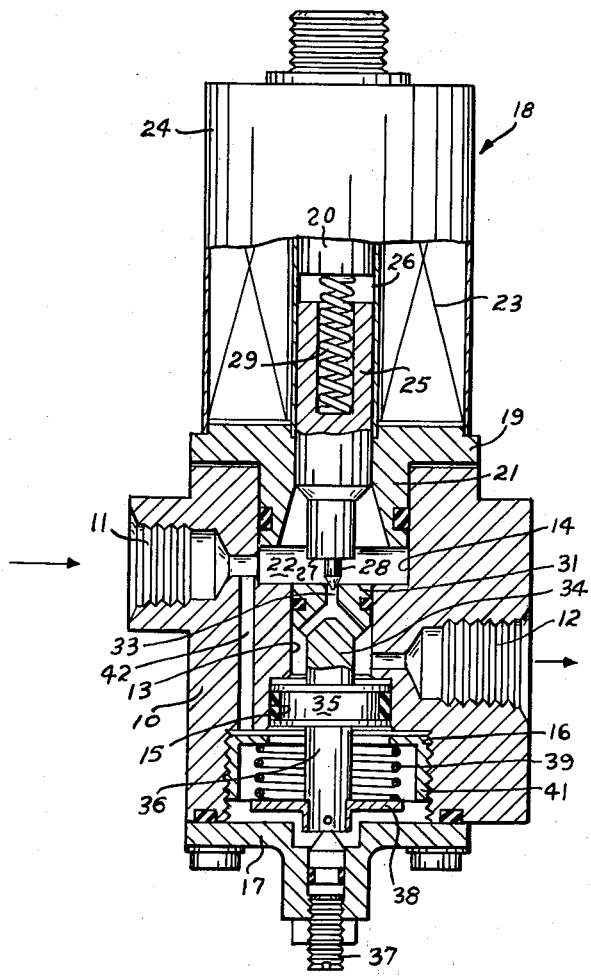
INVENTOR.
EWALD J. KIMM
BY J E Beringer
HIS ATTORNEY 3,115,891
COMBINED SHUT-OFF AND FLOW
REGULATING VALVE
Ewald J. Kimm, Dayton, Ohio, assignor to United Aircraft Products, Inc., Dayton, Ohio, a corporation of Ohio
Filed Nov. 23, 1960, Ser. No. 71,288
2 Claims. (Cl. 137—495)

This invention relates to valves and particularly to valves having a regulating effect upon the mass flow of a pressure fluid to provide constant flow beyond the valve at a predetermined level.

Although not so limited, the invention has especial application to systems flowing an evaporative liquid coolant, for example ammonia, it being an object of the invention to exert a control over liquid flow as described without the use of expansion valves, or separate pressure regulator or both.

Another object of the invention is to provide a valve assembly wherein a valve occupies open and closed positions relative to a flow passage and wherein the pressure differential at the inlet and the outlet of such flow passage is utilized to vary the effective flow area thereof in the open position of the valve.

A further object of the invention is to provide a valve of the kind described of simplified compact construction adapted for a consistent and trouble free operation.

Other objects and structural details of the invention will appear from the following description when read in connection with the accompanying drawing, which is a partly diagrammatic view of a fluid flow control valve in accordance with the illustrated embodiment of the invention.

Referring to the drawing, a valve in accordance with the illustrated embodiment of the invention comprises a body 10 having, in generally opposed relation, an inlet 11 and an outlet 12, the former being in communication with a source of pressure fluid and the latter delivering such fluid under controlled conditions, as will be seen, to a place of use. The body 10 further is formed with a longitudinal through bore 13. At one end of the body is a counterbore 14. At the other end are concentric inner and outer counterbores 15 and 16 respectively. The latter is closed by an end plate 17 mounted on the body. At the opposite end thereof is mounted an electromagnetic unit 18 which includes a base 19 having a center boss 21 received in the counterbore 14 and having a sealing engagement with the wall thereof. The boss 21 defines with the bottom of counterbore 14 a chamber 22 in continuous communication with the inlet 11. Further comprised in the electromagnetic unit 18 is a selectively energizable coil 23 contained in a sealed case 24 and surrounding a longitudinally reciprocable plunger 25. The latter is slidably mounted in a bushing 26 and extends through and beyond such bushing to a bearing in the end plate 19. The projecting end of the plunger 25 is formed with a reduced diameter portion 27 which extends into the chamber 22 and terminates in a needle shaped valve element 28. In accordance with the conventional structural concept of electromagnetic devices of the kind described, the plunger 25 is retracted in response to energizing of the coil 23, a stop 20 limiting such retraction. A spring 29 is interposed between stop 20 and 25 and yieldingly resists retraction thereof, which retraction incorporates a force in the spring for extension of the plunger upon de-energizing of the electrical coil.

A means of adjustment of the stroke of the plunger 25 is provided by using either spacing washers beneath base 19 or by adjusting pin 28 by screwing it into plunger 25.

The flow of pressure fluid from the chamber 22 to the outlet 12 by way of the through bore 13 is controlled by the needle valve 28 acting in cooperation with a piston 31 slidably mounted in the bore 13. A passageway 33 in the piston 31 has a vertical portion aligned with the needle valve 28 and downwardly extending divergent portions opening into the bore 13 in a manner to communicate with outlet 12. In an extended position of the plunger 25 the needle valve 28 is adapted to seat on the piston 31 in a manner to be received in and close the passageway 33 from communication with chamber 22. In a retracted position of the plunger the valve 28 is unseated with respect to the piston 31 and so permits a flow of pressure fluid from the inlet 11 through passageway 33 to outlet 12, the valve 28 and open end of passageway 33 defining a pin and orifice combination.

The piston 31 is connected by a reduced diameter portion 34 with a piston 35 slidably received in the counterbore 15 and sealingly engaged with the side thereof. The assembly comprising piston portions 33 and 35, and connecting stem 34, further includes a shank portion 36 projecting beyond the piston portion 35 and making endwise contact with the inner end of a set screw 37 adjustably mounted in end plate 17. A collar 38 is pinned to the shank 36 and is engaged by compression spring means 39 (which may comprise one or more springs) resting on a base 41 screw threaded for adjustability in the counterbore 16. The collar 38 and spring 39 are contained in the counterbore 16 of body 10. This space is communicated through a passage 42 with the inlet 11. Accordingly, the value of the fluid pressure at inlet 11 is communicated to the counterbore 16 beyond or beneath the piston 35. The counterbore 15 above or in advance of the piston 35 communicates through bore 13 with the outlet 12. As a result, the pressure difference between inlet 11 and outlet 12 is applied across piston 35. An excess of pressure at the inlet over that at the outlet is accordingly productive of a resultant pressure urging the assembly comprising piston 35 and piston 33 inwardly or toward valve 28. The spring 39 provides a counteracting force and tends normally to maintain the piston assembly in an outward position, the limit of which is defined by the set screw 37.

In the operation of the device, with plunger 25 extended as described, passageway 33 is closed by valve 28. Pressure fluid admitted to inlet 11 accordingly is then denied access to outlet 12. Communicated through passage 42 to counterbore 16 the inlet pressure may move piston 35 inwardly in counterbore 15 and effect movement of piston 31 and valve 28, a movement absorbed by spring 29. Upon energizing of the coil 23, plunger 25 is retracted and valve 28 unseated from engagement with piston 31 in a manner to open passageway 33 for flow therethrough. The rate of flow through this passage is affected by the pressure difference between inlet 11 and outlet 12 and the quantity or mass flow to and beyond outlet 12 tends to increase as this pressure difference increases, as a result for example, of an increase in inlet pressure. In accordance with the instant inventive concept, however, an increase in inlet pressure has the result of applying an added inward thrust to the piston 35. When the resultant fluid pressure so applied to piston 35 exceeds the resistance of spring 39 the piston assembly moves inwardly, causing portion 31 to approach the retracted valve 28. This has the effect of bringing the orifice-like open end of passageway 33 into closer relation to the tapered extremity of valve 28 and as a consequence the effective flow area of the passageway is reduced. The rate of flow to outlet 12 accordingly tends correspondingly to be reduced, or, stated more particularly, quantity flow to and from the outlet becomes stable and is held so despite further increases in inlet pressure by reason of further and continued adjustments of the piston portion 31 relative to the needle valve 28.

Installed in a system delivering a liquid coolant to a heat transfer device, for example, the valve assembly of the invention insures that the mass flow of such coolant to the heat transfer device shall remain comparatively constant despite wide pressure variations at the source. The valve assembly is, moreover, one of simple and compact construction not requiring the bulk and complication of pressure reducing devices and moreover obviates the need for expansion valves of the kind which may permit vaporization of coolants of a volatile nature. The set screw 37, it will be understood, affords not only a stop for the piston-valve assembly but also a means of selectively adjusting the initial or normal size of the open flow area in passage 33, in the retracted position of plunger 25.

The adjustment of pin 28 permits controlling the flow at the time the piston 35 has travelled its maximum distance as a result of maximum inlet pressure.

Thus the lowest inlet pressure flow and the maximum inlet pressure flow are both controlled.

The spring force on piston 35, opposing all intermediate inlet pressures, controls the flow at these pressures. Also, the contour of pin 28 can be altered to affect the flow characteristics of the pin and orifice, thus assisting in control of the mass flow.

The instant invention obviates the need for expansion valves, as noted, and provides a valve serving the dual function of an on-off control and of a device to regulate mass flow. It accomplishes these functions, moreover, using a single valve element and seat therefor.

The piston 31 and 35 are sealingly engaged with the side wall of their respective bores. While they are in the illustrated instance slidably received in the bores and sealed through O-rings, the invention does not exclude a use of bellows, diaphragms and like flexible seals. Also part 41 may if desired take the form of one or more screws extending at their one ends through the closure 17 for convenient external adjustment.

What is claimed is:

1. A combined shut-off and flow regulating valve assembly for limiting mass flow of a pressure fluid to a predetermined level, including a valve body having an inlet passage and an outlet passage and an interconnecting interior chamber, movable means slidable in said chamber having a passageway therethrough for restricted communication of said inlet with said outlet, spring means urging said movable means in one direction in said chamber, an adjustable stop mounted in said body to limit motion of said movable means in said one direction, means applying the pressure difference between said inlet and said outlet to said movable means in a direction opposed to said spring, said last named means including a passageway extending from said inlet to said movable means in non-communicating relation to said outlet, tapering valve means projecting through said inlet passage into said chamber and adapted to enter said passageway to control flow therethrough, said valve means having an extended position closing said passageway irrespective of movement of said movable means and further having a retracted position opening said passageway, the effective flow area of said passageway in the retracted position of said valve means varying with movement of said movable means, and means mounted on said body for selectively actuating said valve means.

2. A valve assembly according to claim 1, characterized in that said valve means and said passageway define a pin and orifice combination having a regulating effect as to flow at both minimum and maximum inlet pressures.

References Cited in the file of this patent

UNITED STATES PATENTS 2,756,773    Bauerlein _____ July 31, 1956

FOREIGN PATENTS 561,402    Germany _____ Oct. 13, 1932
882,740    France _____ June 11, 1943
344,882    Switzerland _____ Apr. 14, 1960